United States Patent
Biyani et al.

(10) Patent No.: US 11,848,939 B2
(45) Date of Patent: *Dec. 19, 2023

(54) SYSTEM AND METHOD FOR MANAGING AND SECURING A DISTRIBUTED LEDGER FOR A DECENTRALIZED PEER-TO-PEER NETWORK

(71) Applicant: SMARTAXIOM, INC., Fullerton, CA (US)

(72) Inventors: Amit Biyani, Fullerton, CA (US); Gunjan Karun, Indore (IN)

(73) Assignee: SMARTAXIOM, INC., Fullerton, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/340,928

(22) Filed: Jun. 7, 2021

(65) Prior Publication Data
US 2021/0297424 A1    Sep. 23, 2021

Related U.S. Application Data

(63) Continuation of application No. 16/272,358, filed on Feb. 11, 2019, now Pat. No. 11,032,293.

(60) Provisional application No. 62/628,984, filed on Feb. 10, 2018.

(51) Int. Cl.
| | |
|---|---|
| *H04L 9/40* | (2022.01) |
| *H04L 9/32* | (2006.01) |
| *H04L 9/08* | (2006.01) |
| *H04L 9/12* | (2006.01) |
| *H04L 9/00* | (2022.01) |

(52) U.S. Cl.
CPC .......... *H04L 63/126* (2013.01); *H04L 9/0833* (2013.01); *H04L 9/12* (2013.01); *H04L 9/3226* (2013.01); *H04L 9/3239* (2013.01); *H04L 9/3297* (2013.01); *H04L 63/065* (2013.01); *H04L 9/50* (2022.05); *H04L 2209/043* (2013.01)

(58) Field of Classification Search
CPC ................................................... H04L 63/126
See application file for complete search history.

(56) References Cited

U.S. PATENT DOCUMENTS

| | | | | |
|---|---|---|---|---|
| 10,673,617 | B1* | 6/2020 | Antoniou | G06F 13/4282 |
| 2018/0337769 | A1* | 11/2018 | Gleichauf | H04L 9/0637 |
| 2019/0180276 | A1* | 6/2019 | Lee | H04L 9/3247 |

(Continued)

*Primary Examiner* — Simon P Kanaan
(74) *Attorney, Agent, or Firm* — Kumar Maheshwari; Mahesh Law Group PC (57) ABSTRACT

The present disclosure relates to a method and system for managing and securing a distributed ledger for a decentralized peer-to-peer (p2p) network. The method receives an encrypted block and a group key generated by at least one peer node on the p2p network, wherein each peer node is IoT device and determines a virtual device block in a device chain on verifying the unique device ID, and address of a corresponding event chain associated with the virtual device block. Further, the method generates a transaction ID for a new transaction using the unique ID of the virtual device block and determines a valid event block in the event chain associated with the virtual device block for storing the new transaction and associated transaction ID. Further, the method updates the distributed ledger with the valid event block upon verification by one or more peer IoT devices of the p2p network.

20 Claims, 6 Drawing Sheets

(56) References Cited

U.S. PATENT DOCUMENTS

2019/0340352 A1* 11/2019 Peeters .................. G06F 21/45
2019/0386969 A1* 12/2019 Verzun ................. G06F 21/606

* cited by examiner

SYSTEM AND METHOD FOR MANAGING AND SECURING A DISTRIBUTED LEDGER FOR A DECENTRALIZED PEER-TO-PEER NETWORK

CROSS REFERENCE TO RELATED APPLICATIONS

This application is a continuation application of U.S. patent application Ser. No. 16/272,358, entitled as "SYSTEM AND METHOD FOR MANAGING AND SECURING A DISTRIBUTED LEDGER FOR A DECENTRALIZED PEER-TO-PEER NETWORK", filed Feb. 11, 2019, which claimed benefit of U.S. Provisional Patent Application Ser. No. 62/628,984, entitled as "Systems and Methods for a Blockchain Pattern Using Multiple Blockchains", filed on Feb. 10, 2018, the disclosures of which are incorporated by reference in their entirety.

TECHNICAL FIELD OF THE DISCLOSURE

The present disclosure generally relates to Internet of Things (IoT) security, and more particularly, but not exclusively to a method and a system for managing and securing a distributed ledger for a decentralized peer-to-peer network.

BACKGROUND

Generally, a conventional blockchain is a distributed database system that records all verified and trusted transactions in blocks which are cryptographically linked in a chain. Most common blockchains share a similar monolithic structure and, for security purposes, it becomes extremely difficult to make additions to the blockchain. This makes these single blockchains far too compute and storage intensive to execute on devices like security cameras and gateways at the edge of the Internet. It is also extremely hard to make any large changes to the public blockchain code base, and unfortunately existing schemes to manage the blockchains are not compatible with public blockchain code changes.

Existing blockchain architecture combines multiple functions into one single mechanism, however while scaling requires storage of massive amount of data that may not really need to be stored. There exists a need for blockchain architecture that minimizes storage requirements by not having stale transactions and improving time to authenticate the transactions thereby enabling use of blockchain in real time systems. Thus, there exists a need to meet the real-time requirements while still running within processor and storage requirements of Internet of Things (IoT) devices in an IoT system.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of managing and securing a distributed ledger for a decentralized peer-to-peer (p2p) network. The method comprising step of receiving at least one encrypted block and a group key generated by at least one peer node on the p2p network, wherein each peer node is an IoT device, the at least one encrypted block comprises a unique device identification (ID) of the at least one IoT device, a previous token, a current token, time stamp, and event data generated by the at least one IoT device. The method further comprising step of determining a virtual device block in a device chain on verifying the unique device ID, and address of a corresponding event chain associated with the virtual device block. The method generates a transaction ID for a new transaction, received as the event data, using the unique ID of the virtual device block and the received group key and determines a valid event block in the event chain associated with the virtual device block for storing the new transaction and associated transaction ID. Further, the method updates the distributed ledger with the valid event block upon verification of the transaction ID by one or more peer IoT devices of the p2p network.

Further, the present disclosure relates to system for managing and securing a distributed ledger for a decentralized peer-to-peer (p2p) network. The system comprises a distributed ledger capable of storing one or more blocks, each block comprising a valid transaction and at least one master node, coupled with the distributed ledger, and capable of communicating with at least one peer node, wherein each peer node is an IoT device. The master node comprises a processor, and a memory coupled to the processor, wherein the memory stores processor instructions, which, on execution, causes the processor to receive at least one encrypted block and a group key generated by at least one IoT device on the p2p network. The encrypted block comprises a unique device identification (ID) of the at least one IoT device, a previous token, a current token, time stamp, and event data generated by the at least one IoT device. The processor determines a virtual device block in a device chain on verifying the unique device ID, and address of a corresponding event chain associated with the virtual device block and generates a transaction ID for a new transaction, received as the event data, using the unique ID of the virtual device block and the received group key. Further, the processor determines a valid event block in the event chain associated with the virtual device block for storing the new transaction and associated transaction ID and updates the distributed ledger with the valid event block upon verification of the transaction ID by one or more peer IoT devices of the p2p network.

Furthermore, the present disclosure relates to a non-transitory computer readable medium including instructions stored thereon that when processed by at least one processor cause a master node of an IoT system to perform act of receiving at least one encrypted block and a group key generated by at least one IoT device on the p2p network. The encrypted block comprises a unique device identification (ID) of the at least one IoT device, a previous token, a current token, time stamp, and event data generated by the at least one IoT device. The instructions further cause the processor to determine a virtual device block in a device chain on verifying the unique device ID, and address of a corresponding event chain associated with the virtual device block and generate a transaction ID for a new transaction, received as the event data, using the unique ID of the virtual device block and the received group key. Furthermore, the instructions cause the processor to determine a valid event block in the event chain associated with the virtual device block for storing the new transaction and associated transaction ID and update the distributed ledger with the valid event block upon verification of the transaction ID by one or more peer IoT devices of the p2p network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter.

DETAILED DESCRIPTION OF EXAMPLE EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Overview

The present disclosure relates to a method and a system for managing and securing a distributed ledger for a decentralized peer-to-peer (p2p) network. More particularly, the present disclosure relates to a dedicated blockchain system for IoT that can authenticate, process and record transactions in real-time and uses a new mechanism called Device Virtual Block to provide decentralized and autonomous security for real-time IoT communication. The dedicated blockchain system is designed based on a multichain data schema or architecture that is designed to embed blockchain security fabric to sensors, devices, edge or gateways to secure communication at edge to cloud and data integrity between them. The multichain data schema include a device chain comprising device virtual blocks and an event chain corresponding to each device chain. The multichain data schema uses a time-synchronized envelope mechanism to generate an event to connect different device chains and enforce a set of security rules through smart contracts. The device chain protects identity and privacy of devices based on certain rules within the device chain. The device chain includes virtual blocks of valid transactions. The event chain protects data integrity and confidentiality against malicious packets, unauthorized devices, weak encryption and man-in-the-middle attacks.

In multichain architecture, a virtual distributed hash table (VDHT) of trusted device is maintained. The VDHT stores the device chain and the event chain in a time-synchronized manner. The VDHT stores local commissioned device information with smart contract that include predefined rules to identify device unique identity and source entity of commissioning the device in a group of peer nodes. Every device or sensors maintain the event chain in the transaction pool and size of the pool determined by multiple resource usage like network bandwidth, memory and CPU and its configurable. Every node will flush data of local commission device and ignore data from non-commission devices, thus reducing the size of the pool. By holding only valid transactions in the device chain, and flushing all stale transaction from the memory pool to secure archive storage minimizing edge storage requirements, a lot of storage is being saved. As all transactions are not being stored in the memory, the device chain is authenticated very quickly thereby enabling blockchain system for real time systems that are processing and storage intensive. Thus, the present disclosure enables a secure and efficient management of blockchain system for a decentralized and distributed peer to peer network using multichain architecture with virtual device blocks.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Example Embodiments

Figure 1:
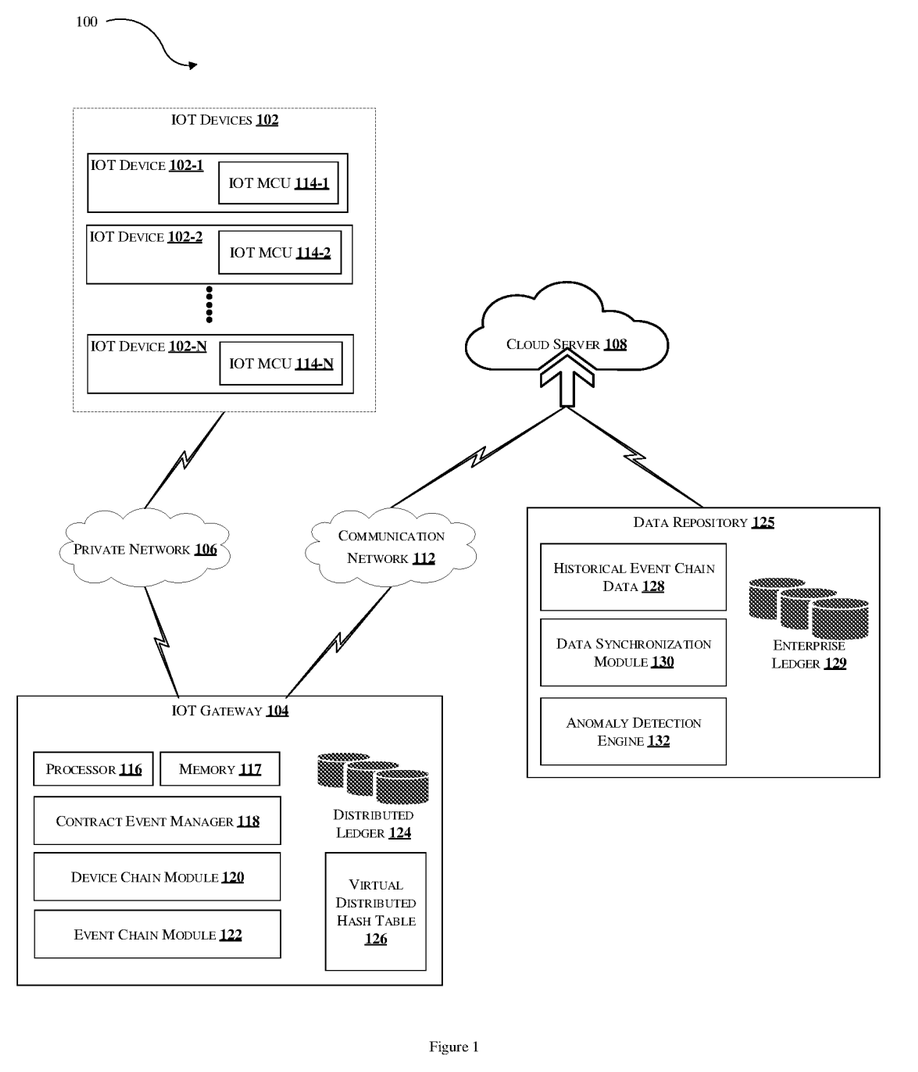
FIG. 1 is a simplified schematic diagram of an Internet of things (IoT) security framework using multichain blockchain in accordance with some embodiments of the present disclosure.

FIG. 1 is a simplified schematic diagram of an Internet of things (IoT) security framework using multichain blockchain in a peer to peer network in accordance with some embodiments of the present disclosure. As shown in FIG. 1, a peer to peer network (p2p) has at least one master node and one or more peer nodes capable of communicating with each other. Each node is an IoT device in an IoT security system 50 for example. The IoT security system 50 includes one or more such IoT devices 102-1, 102-2, . . . 102-N (hereinafter collectively referred to as IoT devices 102), and an IoT gateway device (alternatively referred to as IoT gateway controller or master node) 104 connected via a private network 106. The private network 106 may be a personal area network (PAN) or a p2p network using wired or wireless technology like Bluetooth, ZigBee, Z-wave for exchanging data over short distance in a home-based network. The IoT security system 50 further includes a cloud server 108 and a data repository 125 communicatively coupled with the IoT gateway 104 via a communication network 112. The communication network 112 may include, without limitation, a direct interconnection, local area network (LAN), wide area network (WAN), wireless network (e.g., using Wireless Application Protocol), the Internet, etc.

The IoT devices 102 may be a physical entity (PE) including any object or environment. For example, the IoT devices 102 may be sensors, actuators, controllers, or any external devices capable of being controlled by service or application. In one embodiment, the IoT devices 102 comprise IoT Micro-controller (MCU) 114-1, 114-2, . . . 114-N (hereinafter referred to as IoT MCU 114) capable of enabling operation of the IoT devices 102. Each IoT device 102 may be embedded with a proprietary microcode in the IoT MCU 114 at the time of manufacture, to allow embedding of blockchain onto the IoT devices 102. The microcode in the IoT MCU 114 also enables the functionality to generate encrypted blocks, micro-ledger and store nano-transactions. By using the proprietary microcode, the IoT devices 102 is provided with tamper-resistant features and paired through a key exchange process with Hardware Security Module (HSM) (not shown). The HSM enables key exchange and hashing-less authentication and provides crypto-processing. The IoT MCU 114 is booted as cryptographic check of the resident firmware to ensure that signatures match the last known good version. This helps to avoid attacks involving a downgrade to a previous version of the firmware and clone firmware, as well as attempts to manipulate the firmware and skinny ledger stored in on-board flash memory within the IoT MCU 114. The HSM enables generation of group keys for a group of peer nodes or IoT devices, using input from multiple subkeys that are separately stored in safe deposit boxes located in different states. New signing and contracting keys can be created only if enough subkeys are presented during creating a group and initialize the master node process.

The IoT gateway 104 or master node may be a physical device or an application that serves as the connection establishing points between the IoT devices 102 and the cloud server 108 that enable additional security for the IoT network. The IoT gateway 104 comprises a processor 116, memory 117 communicatively coupled with the processor 116. The IoT gateway 104 also comprises an access manager module (not shown) that enables only authorized application to access a resource such as the IoT devices 102. The access manager module comprises at least a contract event manager 118, a device chain module 120 and an event chain module 122 coupled with the processor 116. The IoT gateway 104 also comprises a distributed ledger 124 and a virtual distributed hash table 126 in the memory 117. The contract event manager 118 enables mutual authentication between the IoT devices 102 to enable permissioned access to event chain data. The device chain module 120 is configured to generate a device chain as a part of the decentralized distributed ledger 124. The users are mapped on the device chain to access the device according to clear access right rules to control the IoT devices 102. The event chain module 122 is capable of maintaining a list of historical data blocks of all events for a given device block in the device chain. The event chain module 122 generates an event chain that is a blockchain storing only a group of events that are verified and stored in valid blocks at periodic intervals of time.

The cloud server 108 is a typical logical server that is built, hosted and delivered through a cloud computing platform over the communication network 112. The cloud server 108 is capable of providing shared storage and processing capabilities, security and control similar to those of a dedicated server. The cloud server 108 is coupled with a data repository 125 for storing historical event chain data 128, and enterprise ledger (alternatively referred to as global ledger) 129. The cloud server 108 provides a cloud-based service using Machine learning, and artificial intelligence global block chain ledger and context aware analysis for threat detection and anomalies identification. In one embodiment, the cloud server 108 includes one or more modules including a data synchronization module 130 and an anomaly detection engine 132. The data synchronization module 130 enables synchronization of the enterprise ledger 129 with the distributed ledger 124 of the IoT gateway 104 to retrieve only valid event blocks stored in the VDHT 126 or the distributed ledger 124 for a predetermined time period. The anomaly detection engine 132 is capable of detecting anomalous patterns and improve the detection of new threads and security challenges.

A peer node (not shown) may be a node on the communication network 112 maintaining the state of the distributed ledger 124 and managing Blockchain codes. The communication network 112 may be a p2p network that comprises one or more peer nodes. A peer node may be a vendor node, a verification node, a normal node, and a Blockchain node. The peer node is configured to manage the event updating, store valid events in the ledger and delivers the valid to subscriber nodes and vendor nodes. The ledger 180-6 may be for example, the distributed ledger 124 as illustrated in FIG. 1.

The distributed ledger 124, as illustrated comprises a transaction log storing at least one block for each transaction. The block may be encrypted block generated by the IoT MCU 114 of the IoT devices 102. The distributed ledger 124 also comprises one or more databases to store keys and hashes. In one embodiment, the distributed ledger 124 stores for example, queries and key values, key history index and block index and hashes. Queries and key values comprises latest written key values and index for use in transaction, supported keyed queries, composite key queries and key range queries. The key history index stores tracking history of a key. The block index and hashes stores block hashes and transaction IDs.

IoT Gateway

Figure 2:
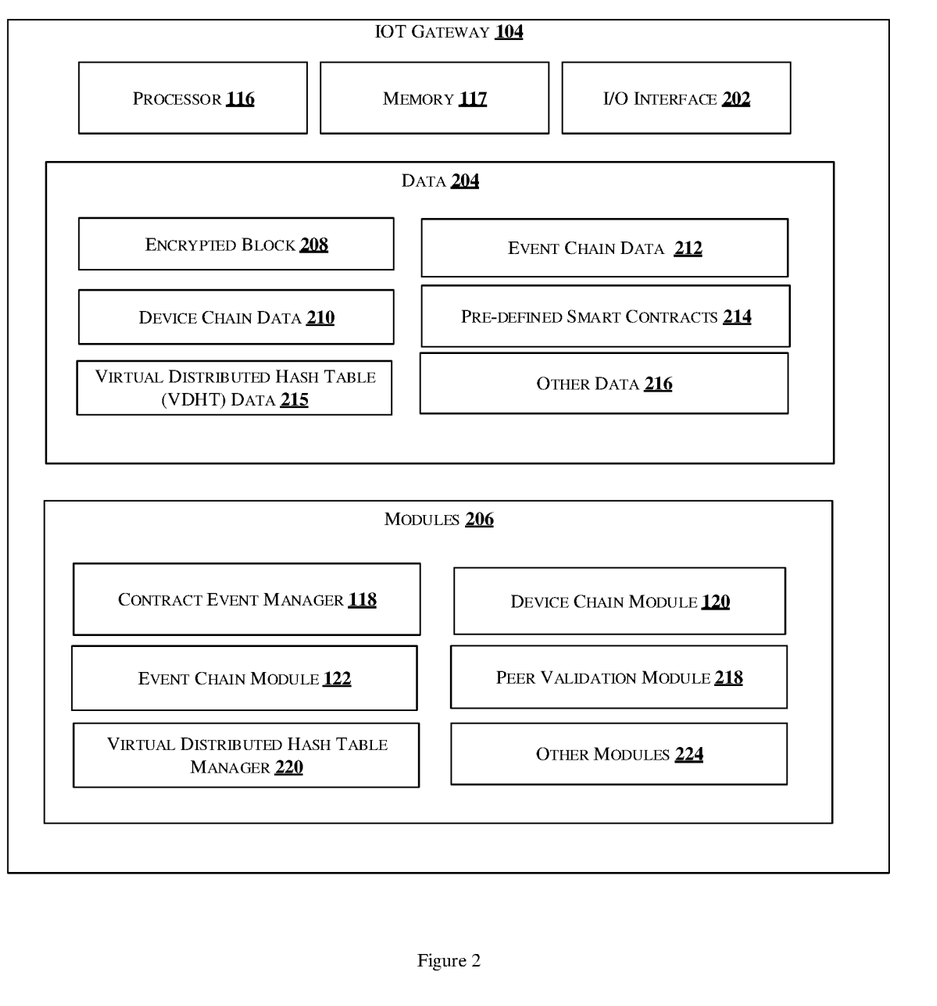
FIG. 2 illustrates a block diagram of a master node of a p2p network of FIG. 1 using multichain blockchain in accordance with one embodiment of the present disclosure.

The IoT gateway 104 of FIG. 1 may be typical IoT gateway or edge device as illustrated in FIG. 2. The IoT gateway 104 comprise the processor 116, the memory 117, and an I/O interface 202. The I/O interface 202 is coupled with the processor 116 and an I/O device. The I/O device is configured to receive inputs via the I/O interface 202 and transmit outputs for displaying in the I/O device via the I/O interface 202. The IoT gateway 104 further comprises data 204 and modules 206. In one implementation, the data 204 and the modules 206 may be stored within the memory 117. In one example, the data 204 may include encrypted block 208, device chain data 210, event chain data 212, pre-defined smart contracts 214, virtual distributed hash table (VDHT) 215 and other data 216. In one embodiment, the data 204 may be stored in the memory 117 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data and temporary files, generated by the modules 206 for performing the various functions of the IoT gateway 104.

The modules 206 may include, for example, the contract event manager 118, the device chain module 120, the event chain module 122, a peer validation module 218 and a VDHT manager 220. The modules 206 may also comprise other modules 224 to perform various miscellaneous functionalities of the IoT gateway 104. It will be appreciated that such aforementioned modules may be represented as a single module or a combination of different modules. The modules 206 may be implemented in the form of software, hardware, combination of software and hardware and/or firmware.

In operation, the IoT gateway 104 is configured to enable a permissioned blockchain that not only performs user authentication but also mutual authentication between the IoT devices 102 thereby generating and securely recording operation and scenario based smart contracts 214. The IoT gateway 104 establishes a peer-to-peer network that authorizes nodes intending to join the network to operate as a Device Chain node and thus facilitates the permissioned distributed ledger system. Further, the IoT gateway 104 determines the resource requirements of the peer-to-peer network, and to validate the reliability of a node intending to join the peer-to-peer network. Further, the IoT gateway 104 provides decentralized and autonomous security for devices or endpoints. Furthermore, the IoT gateway 104 is configured with a Time-sync envelope implementation that decides whether to keep a new packet or discard. The time-sync implementation eliminates malicious packet injection and malicious actors to access trust networks.

Figure 3A:
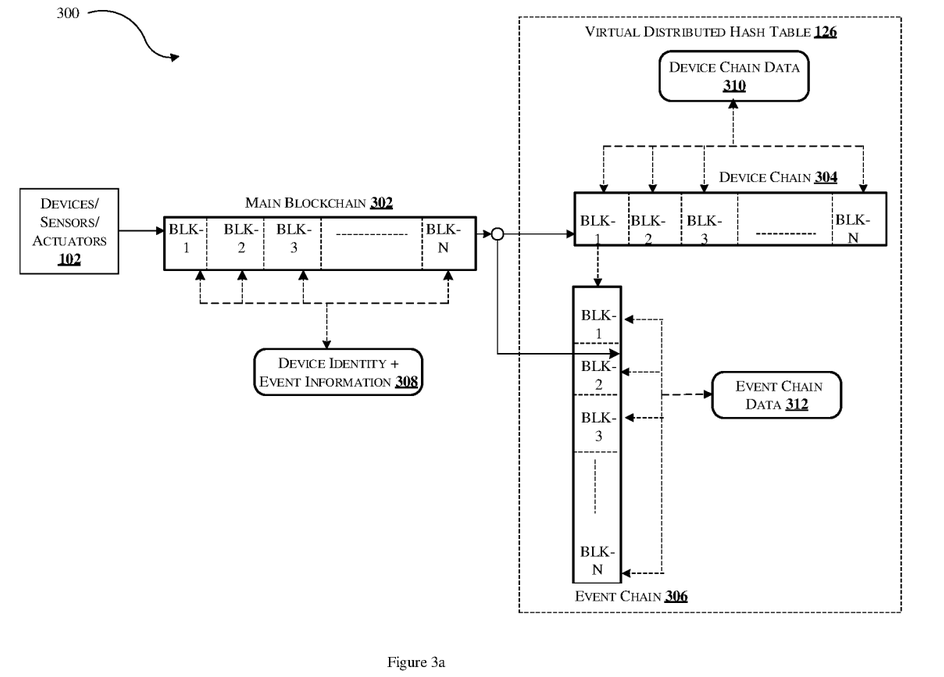
FIG. 3a is a simplified schematic diagram illustrating a multichain blockchain architecture in accordance with one embodiment of the present disclosure.

To facilitate the blockchain for IoT devices 102, the IoT gateway 104 is configured with an IoT dedicated Multi-chain data scheme that includes a device Chain for device security and an event Chain for communication or transaction. The IoT gateway 104 implements a time-synchronization mechanism to validate data events for trusted computing to approach the secure data exchange required by the IoT devices 102. The proposed Multi-chain schema provides real-time data transactions with the device chain for trusting devices and with every device connected to corresponding event chain. FIG. 3a illustrates an exemplary multi-chain schema 300 that comprises multiple block chains.

As illustrated, the multi-chain schema 300 comprises a main blockchain 302 including one or more blocks BLK-1, BLK-2, . . . BLK-N (collectively referred to as block). The main blockchain 302 is divided into at least two blockchains, including a device chain 304 and an event chain 306. Both the device chain 304 and the event chain 306 are stored as part of the distributed ledger 124 and VDHT 126. In one embodiment, peer nodes or IoT devices 102 of the same group share the VDHT 126 for storing the device chain 304 and the event chain 306. Each of the device chain 304 and the event chain 306 comprises one or more virtual blocks BLK-1, BLK-2, . . . BLK-N (collectively referred to as device block and event block respectively). A virtual block may be a valid or an invalid block. The valid blocks are configured to record the transactions or events. Each block of the main blockchain 302 comprises device identity information and event information 308. The device chain 304 will contain every unique non-empty device address and the corresponding event block address along with HW communication link information and Smart contract. For example, each device block of the device chain 304 comprises the device chain data 310 that includes HW communication link and device information associated with each device block. The device information include a device hash including signature hash and link and to previous device signature hash's details like group ID, smart contract, event chain address, data originator information and optional parameters. The event chain 306 is a list of historical data block of all events in given device block. Each event block represent a data generated by a peer node or IoT device 102 at given time. Each event block of the event chain 306 comprises the event chain data 312 that includes device signature, event information and synchronization time associated with each event block.

Figure 3B:
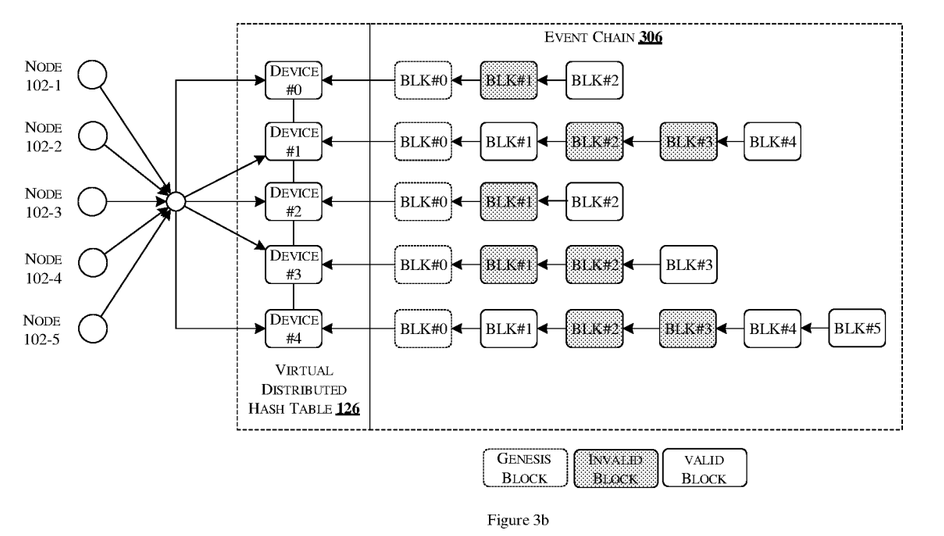
FIGS. 3b and 3c are simplified schematic diagrams illustrating operation of a multichain blockchain architecture in accordance with another embodiment of the present disclosure.

As illustrated in FIG. 3b, there are five nodes Node 102-1, Node 102-2, Node 102-3, Node 102-4 and Node 102-5 that may be the IoT devices 102 having the device chain 304 and the event chain 306 stored in the VDHT 126. The device chain module 120 creates the device chain 304 with one device block for each device in the device chain 304. For example, the device chain 304 comprises at least 5 device blocks for five nodes, one device block for each IoT devices 102, namely Device #0, Device #1, Device #2, Device #3 and Device #4.

Figure 3C:
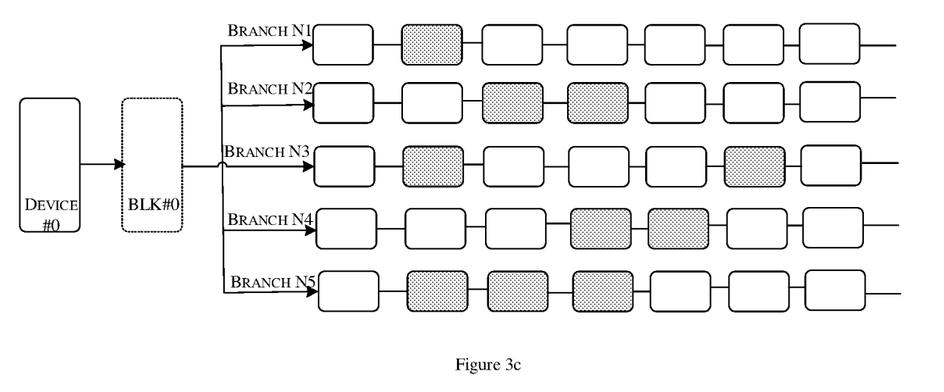
Figure 3D:
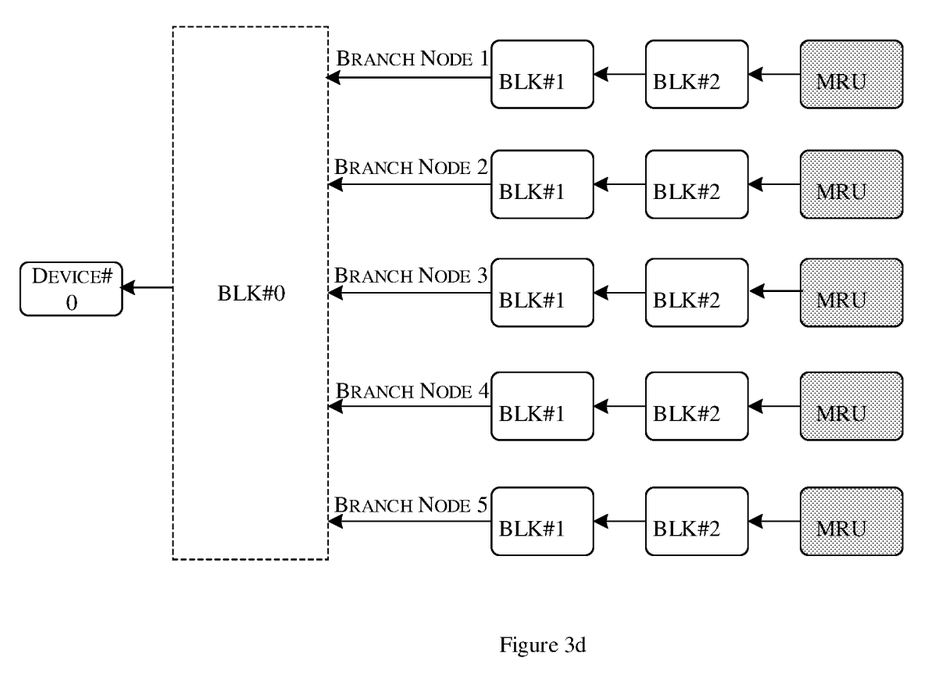
FIG. 3d is a simplified flow diagram illustrating labeling of MRU block in an event chain of the multichain blockchain architecture in accordance with one embodiment of the present disclosure.

For each device block, the event chain 306 comprises at least one event block associated with the device block. For example, the device block Device #0 comprises three event blocks such as BLK #0, BLK #1 and BLK #2. The event block BLK #0 is a genesis block which is a common block used by all mining nodes as illustrated in FIG. 3c. Each node creates a new "branch" for devices and events for mining. For example, as illustrated in FIG. 3c, five branches N1, N2, N3, N4 and N5 are created by the device device #0 for the event block BLK #0. Every block in each branch is a virtual block, that may be a valid or invalid block. Referring back to FIG. 3b, the event block BLK #1 is an invalid block and the event block BLK #2 is a valid block that is available for recording transaction or events. The device chain module 120 uses the device chain 304 to ensure that device identity and privacy information is not disclosed to unauthorized entity (confidentiality) and not modified in unauthorized or accidental manner (integrity). The device chain 304 is best illustrated in FIG. 3d.

As illustrated, for the event block BLK #0 five branch nodes branch node 1, branch node 2, branch node 3, branch node 4, and branch node 5 are created to store one or more event blocks. The most recently used (MRU) event block is only stored in the event chain, hence the event chain 306 do not keep a copy of all historical event blocks. The device chain 304 comprises the device chain data 210 that includes a non-empty unique device address (ID) and corresponding event chain address along with payload information and smart contracts 214. During event generation, the devices identity and authentication of the IoT devices 102 are performed using the smart contracts 214 using time synchronization implementation as described above.

The distributed ledger 124 tracks through the set of event hashes of the set of events and device hashes, and do not allow every single event to alter the distributed ledger 124 on demand. The event chain module 122 break the set of events into at least one group of events for adding/inserting into the event chain 306 in periodic intervals of time, without the need of having the event solved in groups of events as blocks. The event chain module 122 moves the old event blocks from the distributed ledger 124 into a global ledger or the enterprise ledger 129 thereby saving an immense amount of disk space. The event chain module 122 will retain few recent event blocks in the transaction pool to create the event chain 306.

Each event block has the device hash or digital signature embedded in the header that can be verified. This makes sure the previous hash in each block always corresponds to the current hash in the previous block. The event chain module 122 performs another verification (also referred to as proof-of-stake process) for each event block before the event block is accepted into the event chain 306, thereby improving more security and avoiding an attacker to generate a fake event blockchain.

Figure 3E:
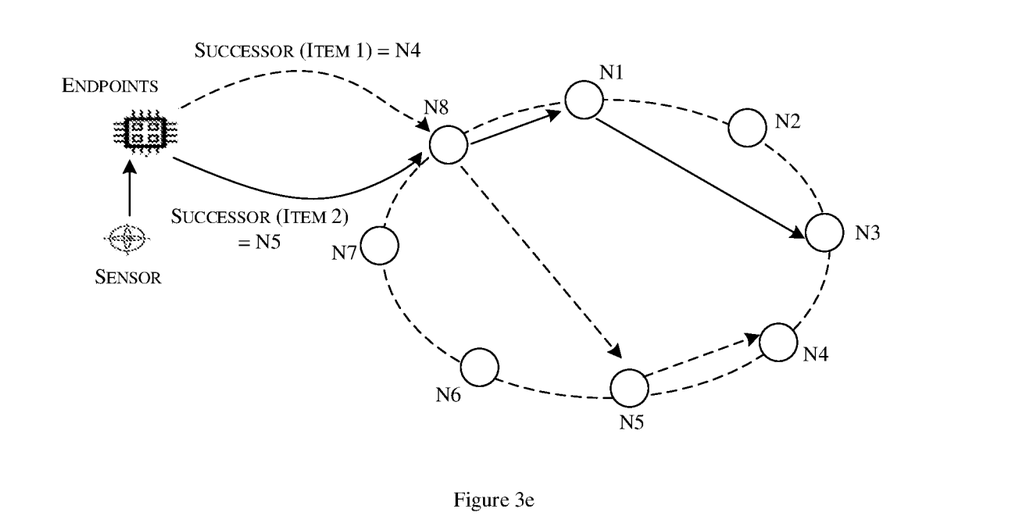
FIG. 3e is a simplified schematic diagram illustrating a multichain peer to peer communication protocol in accordance with one embodiment of the present disclosure.

Further, each event block is validated to be stored in the event chain as valid block. Every peer node in the p2p network must validate the event block generating same result with the same procedure and determining same end result. In one embodiment, all peer nodes are organized into a ring topology, as illustrated in FIG. 3e, where the event block is sent to a successor node over the ring. A successor node is looked up via the VDHT 126 with the unique device ID and corresponding event chain that includes the MRU block. As illustrated, the successor (key) is a function that finds the data key's node through the peer-to-peer network. The successor node is represented as N'. When N' receives the event blocks, N' combines the valid block ID and the data key to generate a transaction ID. To ensure data privacy, N' also signs the transaction with group private key. Thus, N' stores the transaction ID and the event data in a valid block. As determining successor node of each transaction is unpredictable, this helps to ensure data security.

The peer validation module 218 enables mapping of a user device in the device chain 304 with a set of mapping rights. The user on the device chain 304 must be able to access the IoT devices 102 as per the predefined access rules to control the IoT devices 102. The peer validation module 218 ensures that only authorized user should be able to control the specific devices or sensors according to the setting or to only read the status of the devices or sensors. This allows the administrator to set access permissions by the addresses of the users, devices, or gateways. This access right setting is stored in all of the device chain 304 of the blockchain network, and is also shared among all nodes, gateways, and devices. Access and control of users and devices, and transaction authority, are recorded securely in the blockchain. The smart contract 214 can be carried out after the authority is verified compared to this record when the transaction occurs. The types of authority mapping include user-device/gateway mapping, user-user mapping, device/gateway-device mapping. The mapping rights comprises access rights, right to read, right to control/write, transaction rights and other rights. Access rights for example, indicates the right to access the devices or sensors, and able to specify a minimum access rating. A user or device will have a rating, meaning only a specific rating or higher is accessible. If access is not possible, all of the rights below are not available. In another example, the right to read may be a right to read the current state, and detailed authority can be specified as a separate string, and the right to read can be interpreted by the IoT devices 102 to determine whether the right to read is applicable or not.

Further, the right to control/write may be the right to control the device or to change the state. Detailed authority can be specified separately, and the right to control may be interpreted by the IoT devices 102 to determine whether it is applicable or not. Furthermore, the transaction rights specifies configurable rights related to manual and automatic transaction. Detailed authority can be specified separately, and the transaction rights can be interpreted by the IoT devices 102 to determine whether the transaction rights is applicable or not. The method of limiting the maximum transaction count and maximum one-time threshold during a specific period is effective. Other rights (specifying detailed rights) can be specified as a separate code or string and can be interpreted by the IoT devices 102 to determine whether other rights are applicable or not.

All transactions using permissioned blockchain network are determined to be transmitted according to the access right. That is, if a user A has no access to a device B, but still a transaction from A to B occurs, device B and all blockchain nodes will reject this transaction. In this case, the error can be reported to the intrusion detection node in the blockchain, and the administrator can immediately check for the details.

The cloud server 108 will sync with IoT gateway 104 and will add the multiple distributed ledgers (alternatively referred to as edge ledger) 124 to the global or enterprise ledger 129. The global ledger 129 stores data based on grouping and time sequencing for each commissioned device. In one embodiment, the global ledger 129 uses dedicated branch merging techniques to merge all branches and corresponding valid blocks to obtain a single blockchain. This single blockchain is then synchronized with the cloud server 108 to generate the full immutable history of all transactions. The multi-chain blockchain schema of the IoT gateway 104 selects the node that would add the local pending data to the global ledger 129. The cloud server 108 first validates the selected edge ledger 124, and the selected group and location adds the local pending data as a new block to the global ledger 129.

The cloud server 108 is configured with Machine Learning and Artificial Intelligence (M), Global Blockchain Ledger, and Context Aware Analysis for threat detection and anomalies identification. The proposed blockchain architecture is operable with private, public, and dedicated cloud services. The cloud server 108 is capable of building AI models to detect anomalous patterns and improve the detection of new threads, and security challenges. The cloud server 108 is configured with key features comprising device behavioral analytics platform, ensemble of outlier detection methods, mechanism to obtain feedback from security analysts and supervised learning module.

Figure 4:
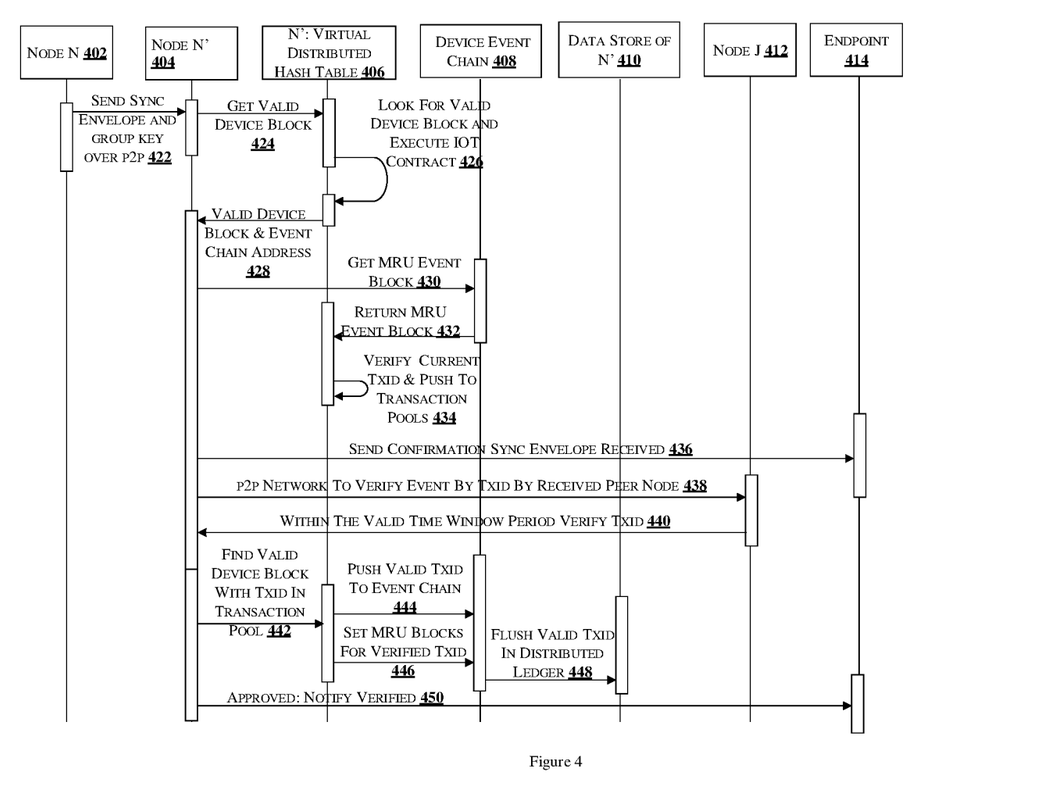
FIG. 4 is a simplified schematic flow diagram illustrating a method of managing and securing distributed ledger for a decentralized p2p network in accordance with one embodiment of the present disclosure.

FIG. 4 illustrates the flow diagram of mine-transact-approve-verify model using the multichain architecture to manage and secure distributed ledger using the VDHT 126 in a p2p network. The flow comprises one or more actors include Node N 402, Node N' 404, N' VDHT 406, device event chain 408, data store of N' 410, Node J 412, and an endpoint or IoT device 102. In one embodiment, the IoT MCU 114 of the IoT devices 102 generates at least one encrypted block 208 using the microcode embedded within the IoT MCU 114 and send the at least one encrypted block 208 to the successor node N' 404 at step 422. The successor node N' 404 is determined as best illustrated in FIG. 3e. The encrypted block 208 may comprise a unique device ID, previous token, current token, time stamp and event data of the IoT devices 102 stored in a micro ledger within the IoT MCU 114. The micro ledger may also be generated by the microcode embedded within the IoT MCU 114. The microcode also defines the smart contract (alternatively referred to as a device contract). The smart contract defines at least one pre-configured condition that may be complied with among participating nodes or entities to involve in a contractual agreement to automate the execution of payments or transaction in a transparent manner. The smart contract for the IoT devices 102 may also referred as IoT contract. The IoT contract is a transaction that transfers control commands between user-to-device or device-to-device and to use the transaction based on authentication.

Before using the transaction, the user and the device must first be registered in the event chain 306, through an authentication procedure. In the case of the user, only the authorized user is authenticated using two-factor authentication technique to access the blockchain network. The user registration is initiated for every user and an account is created with user details such as a user ID, a password, a one-time password or a biometric authentication (fingerprint, iris, face recognition etc.) based on which the user verification is performed.

The IoT devices 102 can commission by the device or the administrator. The commissioning process identifies the IoT devices 102 and commission the associated device by generating a unique ID for each IoT device 102 added in the blockchain network. Several methods are being considered to determine the unique ID of the IoT devices 102. In one embodiment, the IoT devices 102 may be assigned with the unique ID generated by the microcode of the IoT MCU 114. In another embodiment, the IoT devices 102 can register the hash of unique response information, MAC address, CPU ID, disk ID, OS image, electronic wallet address, etc., to generate the unique device ID so that the IoT devices 102 can be automatically disconnected from the blockchain network and reported to the administrator whenever the IoT devices 102 is determined to be tampered.

Further, based on the smart contract, when the status of a program running on the IoT devices 102 changes, the smart contract can manipulate the IoT devices 102, perform automatic transactions between the IoT devices 102, or transmit status information or data to a predetermined location. At this time, automatic transaction between the IoT devices 102 is called M2M transaction, and transactions can be made only to the addresses allowed to transfer in the user-device and device-device mapping advanced during commission. Device A, which receives the commands, can transmit status or control information to another device B according to the program contents and may be control device B. An automated program is added to the Smart contract allowing the user to control the device, be informed about the status of the device, automatically proceed with transactions if a certain condition is fulfilled, etc. The automated program can deliver simple formatted data according to the device's conditions, and the automated program can be provided with a programmable API type to handle more complex information. In higher performance devices, more complex and sophisticated high-level programming is added to the smart contract and delivered to the IoT devices 102, and the smart contract may be interpreted and processed through an interpreter or smart trigger operating within the IoT devices 102.

The Node N' 404 receives the at least one encrypted block 208 from the Node N 402 to determine a valid device block at step 424. The encrypted block 208 comprises a unique device identification (ID), previous token, current token, time stamp, and event data. In one embodiment, the contract event manager (CEM) 118 of Node N' 404 executes the smart contract to verify the device signature and identify information that transmitted the at least one encrypted block 208. The VDHT manager 220 parses the at least one encrypted block 208 to determine the unique device ID of the IoT devices 102 in the N' VDHT 406. The VDHT manager 220 verifies the device signature and identity using the device chain module 120. In one embodiment, the device chain module 120 compares the unique device ID of the encrypted block 208 with the unique ID of the IoT devices 102 stored in the device chain data 210 to verify the device signature and identity by CEM 118 of Node N' 404 executing IoT smart contract. Upon successful verification, the VDHT manager 220 determines the event chain address upon validating the device ID at step 426 that can be accessed using the previous token, and the current token of the encrypted block 208. The VDHT manager 220 transmits the valid device block and event chain address to the Node N' 404 at step 428.

The Node N' 404 verifies the event chain address received from the VDHT manager 220 and transmits a request for the MRU event block to the VDHT manager 220 at step 430. The VDHT manager 220 looks up to the device chain 304 and the event chain 306 stored in the N' VDHT 406 and retrieves the MRU event block at step 432. The VDHT manager 220 further verifies the transaction ID of the MRU event block and push to the transaction pool at step 434. In response to receipt of the MRU event block in the transaction pool, the Node N' 404 transmits a confirmation message at step 436 to source node or originating endpoint 414 indicating that synchronization envelope is received.

The validated event data may be hereinafter referred to as valid event block. The valid event block is encapsulated as envelope for distributing to the peer nodes such as Node J 412 across the p2p network for verification or validation by the peer nodes at step 438. The peer nodes also include verification nodes to verify the envelope. In one embodiment, the distributed ledger 124 is updated with the valid event block verified by the peer nodes. The peer nodes are polled with the transaction ID for verification of the new transaction. The Node J 412 may transmit the verification message comprising the peer verified transaction ID to the Node N' 404 within a valid time window period at step 440. Upon successful verification of the transaction ID received from all polled peer nodes, the valid event block is then added to the distributed ledger 124.

In one embodiment, the VDHT manager of N' (not shown) determines valid device block with transaction ID in the transaction pool in the N' VDHT 406 at step 442. The VDHT manager of N' determines that the transaction ID is verified by a maximum number of peer nodes within the predetermined valid time window period, and identifies the valid device block associated with the verified transaction ID and corresponding event chain associated with the valid device block. On determination of the valid device block, the VDHT manager of N' pushes the valid transaction ID to the device event chain 408 at step 444. Further, the VDHT manager of N' sets MRU blocks for the verified transaction ID at step 446. The device event chain 408 is updated with the MRU blocks set by the VDHT manager of N'. The Node N' 404 thereafter flushes the valid transaction ID in the distributed ledger 124 of the data store of N' 410 at step 448 and transmits approval message to the originating node or endpoint 414 that the event block is successfully validated.

In one embodiment, a communication service of the Node N' 404 generates automatic broadcast messages comprising the valid event block and broadcasts to all peer nodes in the public network. The valid event block may also be updated in the enterprise ledger 129 by the cloud server 108 and further stored in a time-series database coupled with the enterprise ledger 129. Thus, the present system ensures that the event data was not compromised and accessed by unauthorized people, thereby enabling secure access to the IoT devices with improved authentication & identity, authorization, privacy, confidentiality and integrity. Thus, the disclosed blockchain architecture minimizes storage requirements by not having stale transactions and improves time to authenticate the transactions thereby enabling use of blockchain in real time systems. The present disclosure also meet the real-time requirements while still running within processor and storage requirements of Internet of Things (IoT) devices in an IoT system.

Figure 5:
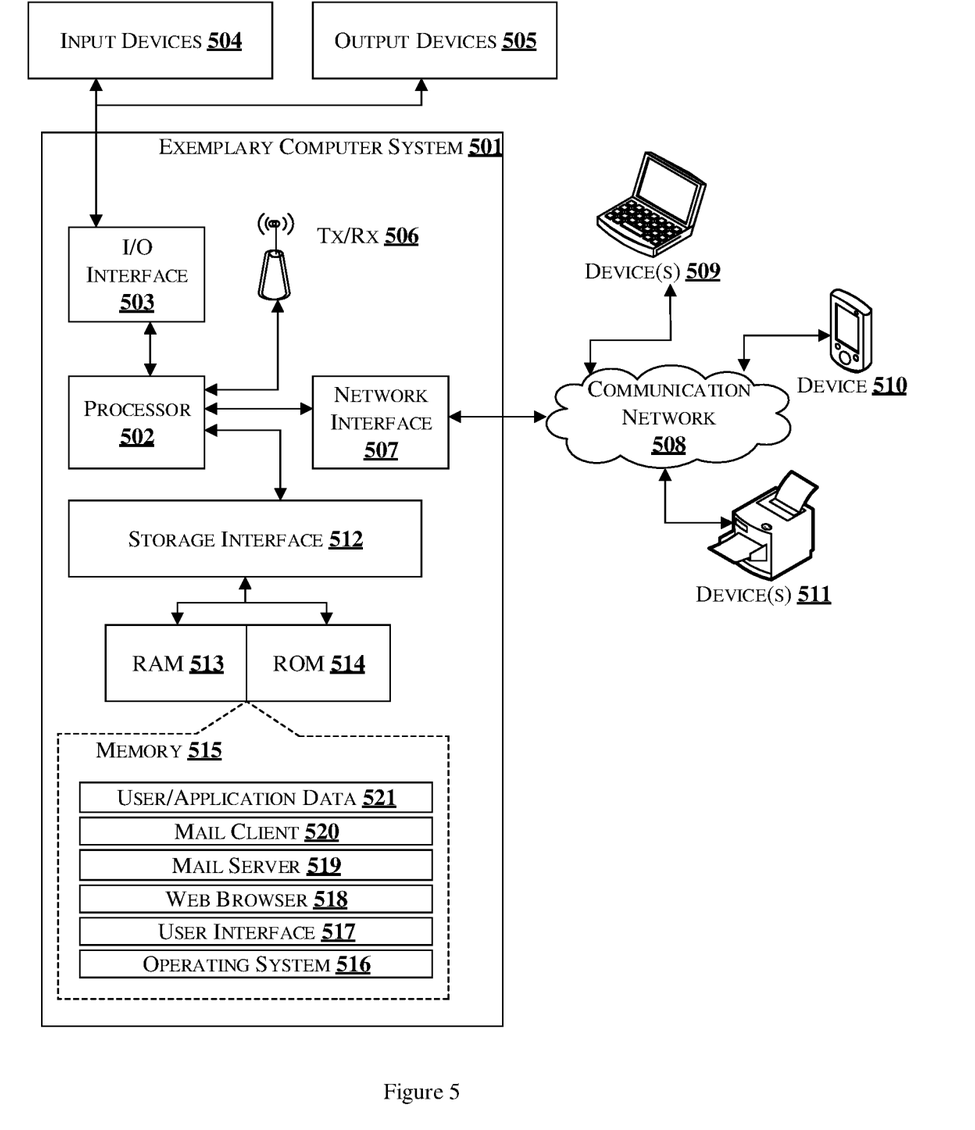
FIG. 5 is a simplified block diagram of an exemplary computer system for implementing embodiments consistent with the present disclosure.

FIG. 5 is a block diagram of an exemplary computer system for implementing embodiments consistent with the present disclosure.

Variations of computer system 501 may be used for implementing all the computing systems that may be utilized to implement the features of the present disclosure. Computer system 501 may comprise a central processing unit ("CPU" or "processor") 502. The computer system 501 may be a master node 104, in one example. The processor 502 may comprise at least one data processor for executing program components for executing user- or system-generated requests. The processor 502 may include specialized processing units such as integrated system (bus) controllers, memory management control units, floating point units, graphics processing units, digital signal processing units, etc. The processor 502 may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver 506 may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface 507 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices 509, 510 and 511 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface 512 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 515 may store a collection of program or database components, including, without limitation, an operating system 516, a user interface application 517, a web browser 518, a mail server 519, a mail client 520, user/application data 521 (e.g., any data variables or data records discussed in this disclosure), etc. The operating system 516 may facilitate resource management and operation of the computer system 501. Examples of the operating system 516 include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface application 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser 518 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. The web browser 518 may utilize facilities such as AJAX, DHTML, Adobe Flash, JavaScript, Java, application programming interfaces (APIs), etc. In some embodiments, the computer system 501 may implement a mail server 519 stored program component. The mail server 519 may be an Internet mail server such as Microsoft Exchange, or the like. The mail server 519 may utilize facilities such as ASP, ActiveX, ANSI C++/C#, Microsoft .NET, CGI scripts, Java, JavaScript, PERL, PHP, Python, WebObjects, etc. The mail server 519 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client 520 may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. A method of managing a distributed ledger for a decentralized peer-to-peer (p2p) network, comprising:
    receiving, by a processor of a controller of an IOT system, at least one encrypted block and a group key generated by at least one IOT device on the p2p network, wherein the at least one encrypted block comprises a unique device identification (ID) of the at least one IOT device, a previous token, a current token, time stamp, and event data generated by the at least one IOT device;
    determining, by the processor, the at least one encrypted block in a device chain on verifying the unique device ID, and address of a corresponding event chain associated with the device chain;

generating, by the processor, a transaction ID for a new transaction, received as the event data, using the unique ID of the at least one encrypted block and a received group key;

validating, by the processor, a valid event block in a corresponding event chain associated with the at least one encrypted block for storing the new transaction and an associated transaction ID; and verifying, by the p2p network, the valid event block.

2. The method of claim 1 wherein validating a valid event block comprises:

receiving the at least one encrypted block by a successor node in the p2p network;

executing a smart contract to verify a device signature and identity using a device chain module;

retrieving a most recently used (MRU) event block based on the at least one encrypted block;

verifying that the MRU event block is a valid event block;

transmitting a confirmation message of the valid event block to an end point; and verifying, by the p2p network, the valid event block.

3. The method of claim 2, wherein verifying by the p2p network comprises:

polling one or more peer IOT devices in the p2p network with the ID of the at least one encrypted block;

determining, based on polling, that the transaction ID is a verified transaction ID by a maximum number of one or more peer IOT devices within a predetermined time period; and identifying, upon a determination, the at least one encrypted block associated with the verified transaction ID and a corresponding event chain associated with the at least one encrypted block.

4. The method of claim 3, further comprising updating, by the processor, the valid event block of an identified event chain with the verified transaction ID and corresponding event data; and updating, by the processor, the distributed ledger with the valid event block upon successful updating of the valid event block.

5. The method of claim 4, wherein the device chain and the event chain are time-synchronized and stored in a virtual distributed hash table (VDHT).

6. The method of claim 4, further comprising removing, by the processor, old event blocks from the distributed ledger into a global ledger.

7. The method of claim 4, wherein the one or more peer IOT devices in the p2p network authorize nodes intending to join the p2p network to operate as a device chain node.

8. A system for managing a distributed ledger for a decentralized peer-to-peer (p2p) network, comprising:

the distributed ledger capable of storing one or more blocks, each block comprising a valid transaction;

at least one controller, coupled with the distributed ledger, and capable of communicating with at least one IOT device, wherein the at least one controller comprises:

a processor; and a memory coupled to the processor, wherein the memory stores processor instructions, which, on execution, causes the processor to:

receive at least one encrypted block and a group key generated by at least one IOT device on the p2p network, wherein the at least one encrypted block comprises a unique device identification (ID) of the at least one IOT device, a previous token, a current token, time stamp, and event data generated by the at least one IOT device;

determine the at least one encrypted block in a device chain on verifying the unique device ID, and address of a corresponding event chain associated with the device chain;

generate a transaction ID for a new transaction, received as the event data, using the unique ID of the at least one encrypted block and a received group key;

validate a valid event block in a corresponding event chain associated with the at least one encrypted block for storing the new transaction and an associated transaction ID; and verify the valid event block.

9. The system of claim 8, wherein validate a valid event block comprises the steps of:

receiving the at least one encrypted block by a successor node in the p2p network;

executing a smart contract to verify a device signature and identity using a device chain module;

retrieving a most recently used (MRU) event block based on the at least one encrypted block;

verifying that the MRU event block is a valid event block;

transmitting a confirmation message of the valid event block to an end point; and verifying, by the p2p network, the valid event block.

10. The system of claim 9, wherein verify by the p2p network comprises the steps of:

polling one or more peer IOT devices in the p2p network with the ID of the at least one encrypted block;

determining, based on polling, that the transaction ID is a verified transaction ID by a maximum number of one or more peer IOT devices within a predetermined time period; and identifying, upon a determination, the at least one encrypted block associated with the verified transaction ID and a corresponding event chain associated with the at least one encrypted block.

11. The system of claim 10, wherein the processor instructions further cause the processor to:

update the valid event block of an identified event chain with the verified transaction ID and corresponding event data; and update the distributed ledger with the valid event block upon successful updating of the valid event block.

12. The system of claim 11, wherein the device chain and the event chain are time-synchronized and stored in a virtual distributed hash table (VDHT).

13. The system of claim 11, wherein the processor instructions further cause the processor to remove old event blocks from the distributed ledger into a global ledger.

14. The system of claim 11, wherein the one or more peer IOT devices in the p2p network authorize nodes intending to join the p2p network to operate as a device chain node.

15. A non-transitory computer readable medium including instructions stored thereon that when processed by at least a processor cause a controller of an IOT system to perform acts of:

receiving at least one encrypted block and a group key generated by at least one IOT device on the p2p network, wherein the at least one encrypted block comprises a unique device identification (ID) of the at least one IOT device, a previous token, a current token, time stamp, and event data generated by the at least one IOT device;

determining the at least one encrypted block in a device chain on verifying the unique device ID, and address of a corresponding event chain associated with the device chain;

generating a transaction ID for a new transaction, received as the event data, using the unique ID of the at least one encrypted block and a received group key;

validating a valid event block in a corresponding event chain associated with the at least one encrypted block for storing the new transaction and an associated transaction ID; and verifying, by the p2p network, the valid event block.

16. The non-transitory computer readable medium of claim 15, wherein validating a valid event block comprises:

receiving the at least one encrypted block by a successor node in the p2p network;

executing a smart contract to verify a device signature and identity using a device chain module;

retrieving a most recently used (MRU) event block based on the at least one encrypted block;

verifying that the MRU event block is a valid event block;

transmitting a confirmation message of the valid event block to an end point; and verifying, by the p2p network, the valid event block.

17. The non-transitory computer readable medium of claim 16, wherein verifying by the p2p network comprises:

polling one or more peer IOT devices in the p2p network with the ID of the at least one encrypted block;

determining, based on polling, that the transaction ID is a verified transaction ID by a maximum number of one or more peer IOT devices within a predetermined time period; and identifying, upon a determination, the at least one encrypted block associated with the verified transaction ID and a corresponding event chain associated with the at least one encrypted block.

18. The non-transitory computer readable medium of claim 17, wherein the instructions further cause the controller of the IOT system to perform the acts of:

updating the valid event block of an identified event chain with the verified transaction ID and corresponding event data; and updating the distributed ledger with the valid event block upon successful updating of the valid event block.

19. The non-transitory computer readable medium of claim 18, wherein the device chain and the event chain are time-synchronized and stored in a virtual distributed hash table (VDHT).

20. The non-transitory computer readable medium of claim 18, wherein the one or more peer IOT devices in the p2p network authorize nodes intending to join the p2p network to operate as a device chain node.

* * * * *